April 20, 1926.

R. W. DORN 1,581,723

IRRIGATION VALVE AND FITTING

Filed July 20, 1922   2 Sheets-Sheet 1

Inventor:
Robert W. Dorn,
by Wm. H. Babcock & Son
Att'ys.

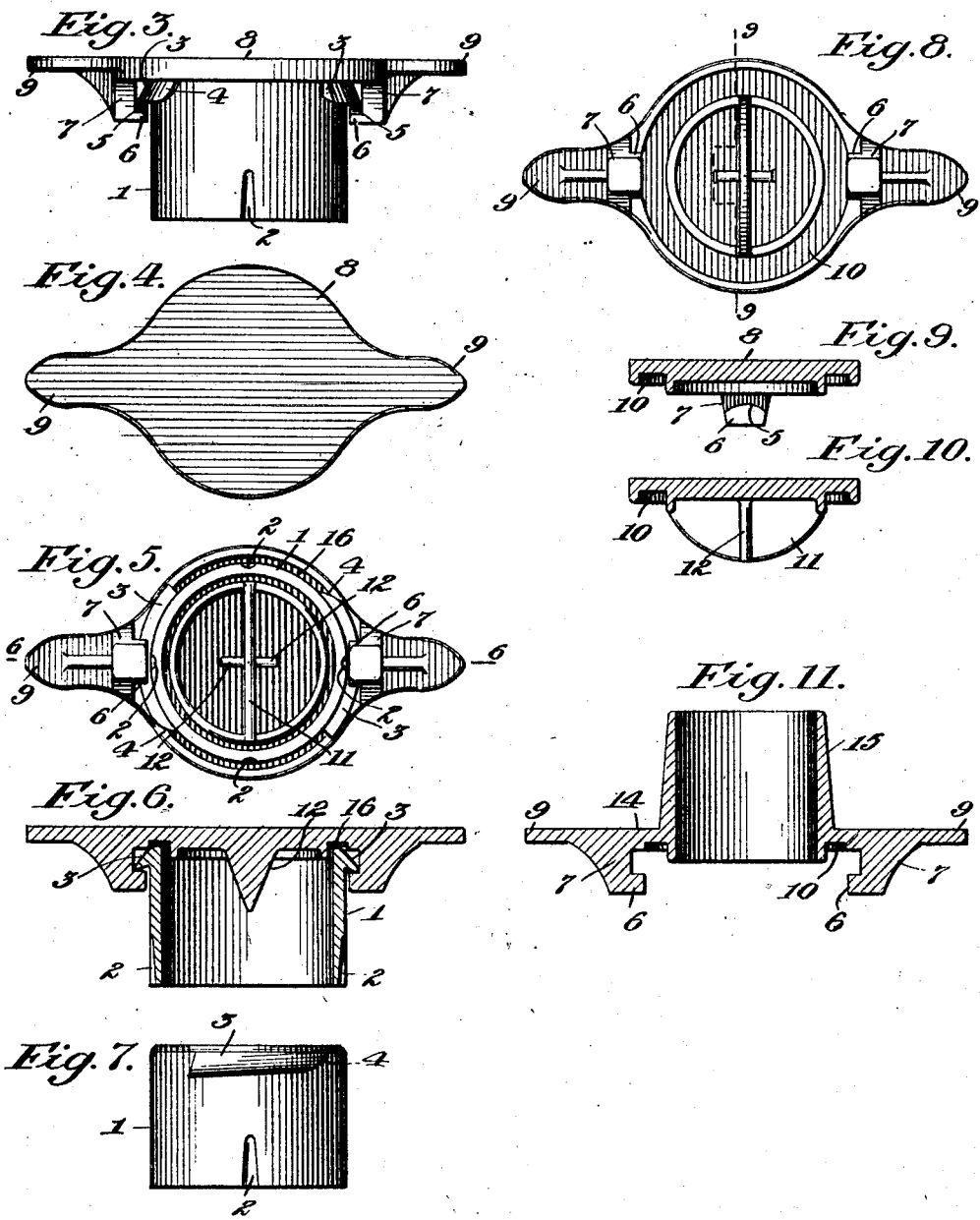

Patented Apr. 20, 1926.

1,581,723

UNITED STATES PATENT OFFICE.

ROBERT W. DORN, OF LARKINS, FLORIDA.

IRRIGATION VALVE AND FITTING.

Application filed July 20, 1922. Serial No. 576,253.

*To all whom it may concern:*

Be it known that I, ROBERT W. DORN, a citizen of the United States, residing at Larkins, in the county of Dade and State of Florida, have invented certain new and useful Improvements in Irrigation Valves and Fittings, of which the following is a specification.

This invention relates to fittings for or elements of irrigation systems and is especially adapted and intended for use in so-called low-pressure irrigation systems for irrigating porous soil, such, for instance, as are in use in Florida in irrigating citrous fruit groves.

In irrigating such soil an abundant flooding periodically is infinitely more effective and beneficial than a continuous spraying as the latter is subject to rapid evaporation and does not penetrate to a satisfactory depth, and the flooding system can be operated periodically and at a low pressure with but little fuel expense, whereas the spray system must be operated under high pressure, involving high initial cost and high running expense for fuel, lubricating oil and other running expenses.

The objects more particularly in view are to provide an outlet collar to be mounted in the outlets of outlet sections arranged at regular intervals in the system, and provide a valve or cap to close the opening in said collar to prevent the escape of water therethrough; to so form the said collar and said valve or cap that they will combine with each other in facilitating the correct positioning of the valve or cap in its application to, and the rapid and tight application of the valve or cap to, said collar, and will facilitate its removal from said collar; and to provide an outlet fitting and elbow or spout interchangeable with any one of the valves or caps and formed in such manner as to cooperate with any one of said collars, all of which objects, among others, are accomplished by the invention hereinafter set forth and claimed.

Figure 1:
Figure 2:
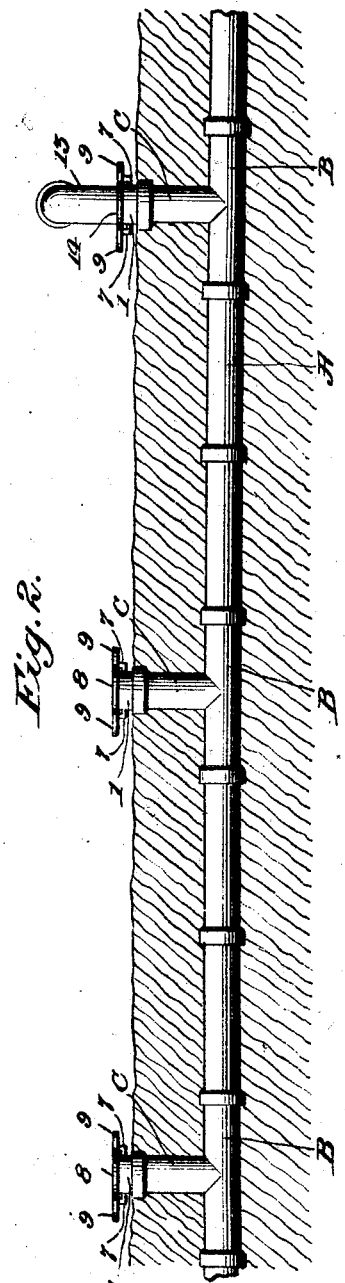

In the accompanying drawings:

Figure 1 represents a plan view of an under-ground tile-pipe low-pressure system equipped with collars, valves or caps and an outlet elbow as contemplated by my invention;

Figure 2, a side elevation thereof, the ground being shown as cut away;

Figure 3, an elevation of the collar and valve or cap, in combined relation;

Figure 4, a top plan view of the valve or cap;

Figure 5, a bottom plan view of the collar and valve or cap in combined relation;

Figure 6, a sectional view on the line 6—6 of Fig. 5;

Figure 7, an elevation of the collar by itself, and at right angles to the view shown in Fig. 3;

Figure 8, a bottom plan view of the valve or cap alone;

Figure 9, a sectional view on the line 9—9 of Fig. 8, looking away from the positioning rib or web;

Figure 10, a sectional view on the line 9—9 of Fig. 8 looking in the direction of the positioning rib or spider; and Figure 11, a central cross-sectional view through the coupling casting 14 of the outlet elbow 13 shown in Figs. 1 and 2.

Referring now in detail to the drawings, A designates the underground tile-pipe line composed of sections of tubular draining tiling such as now commonly known, the end of one section of the tiling fitting into the enlarged or bell-end of the next, said pipeline having at regular intervals the T outlet sections having the outlet part C extending up to the surface of the ground and having its upper end enlarged or cupped, as usual, to receive an outlet collar 1, which is preferably of cast iron and is to be secured in position by cement or the like poured in between its outer face and the inner face of the enlarged upper end portion of part C. To guard against the collar 1 becoming loose so as to turn about its axis in said enlarged end I form said collar 1 with grooves 2 to form keys in the cement or binder when the same sets.

The upper end of said collar 1 is provided externally with curvilinear wedge flanges 3 to cooperate with the valve or cap 8.

In the form illustrated two of these curvilinear wedging flanges are provided, being arranged diametrically opposite each other and with the curved or forward end 4 of one presented toward the rear end of the other, both of said flanges 3 being of corresponding size and shape in order to give a screw-action.

The forward end 4 of each flange 3 is rounded, increasing in thickness radially outwardly from front toward rear, and increasing in width axially of the collar 1 first on an abrupt curve, and thereafter gradually until the rear end of the flange is reached. Also, each said flange has its operative face undercut, so that it presents only a narrow edge at its radially outer portion for engagement by the curved faces 5 of the fingers 6 of arms 7 of the valve or cap 8, which faces 5 are formed on an arc of a relatively small circle, giving an abruptly curved surface facilitating easy and quick engagement with the cooperating curved ends 4 of the cams or flanges 3. Thus, in use there will be but a very slight portion of each surface 5 in engagement with the thin edges of the respective flanges 3, theoretically but a single point contact as to each such said surface 5, thus avoiding large frictional surface contact and facilitating the ease of application and removal of the valve or cap 8. Further, by having such small contact surface, the cost of the finished product is greatly decreased inasmuch as in machining it will be necessary to machine only a thin edge surface and, very slightly, a small portion of the surface 5 of the finger 6 of each of the arms 7. Further, in case of any slight defect in the casting operation resulting in slightly uneven length between the intervals between the surfaces 5 of the respective fingers 6 and the adjacent face of the valve or cap 8, this defect may be easily corrected simply by grinding off the upper part of the central portion of the finger 6 which is too close to the said adjacent face of the valve or cap 8, instead of grinding down the entire surface of the face 5 of said finger 6.

The valve or cap 8 is provided with two grips or handles 9 for ease of application and removal.

The lower face of the valve or cap 8 is formed with a wide packing groove 10 considerably wider than otherwise necessary to give ample leaway for defects in casting, and is provided with a positioning rib or web 11, which has formed with it, in the form illustrated, two small reinforcing webs 12. This positioning rib or web 11 is a great aid in the quick application of the valve or cap 8 to an open collar 1, this because of the fact that as the valve or cap 8 is applied, as soon as it gets closely adjacent to the end of the collar 1, it will be subject to "skating" on the outflowing water, it being remembered that the water is flowing out of the outlet and that it is not feasible to see that the valve is exactly centered just before the fingers 6 take hold. However, with this positioning rib, when the valve 8 gets to the position mentioned, the said rib 11 will fit into the open end of the collar 1, effectually preventing such "skating" and correctly positioning the valve or cap 8 if not already in correct position, so that all that is necessary to apply one of these valves or caps 8 is to clap it down on the collar 1 and then give it a partial rotation in the correct direction until the surfaces 5 of the fingers 6 of arms 7 come into tight engagement with the lower edges of the respective flanges 3.

The outlet spout 13 is provided with an outlet fitting or casting 14, shown in Fig. 11, of the same construction as the valves or caps 8 except that the central portion, including the positioning web 11, is eliminated, and, instead, an annular flange 15 is provided around such central opening and has a tapering outer face to frictionally engage in the lower end of the sheet metal outlet spout or elbow 13, from which a canvas or other flexible tube 17 conveys the water to the tubular, preferably sheet metal, conveyers or distributers 18. The outlet elbow 13 with its casting 14 is interchangeable with the valve 8 and may be applied to any one of the collars 1, it being understood that only one such elbow will be applied at a time to any of the outlet collars on a line of piping, the valves or caps 8 being securely in place on all the other outlet collars 1 of said pipe-line.

A suitable packing 16 is arranged in the packing groove 10 of each valve or cap 8, to bear against the upper edge of the respective collars 1 and prevent the escape of water between said valve 8 and the edge of collar 1.

Having thus described my invention, what I claim as new and desire to secure by Letters Patent is:

For use as cooperating elements of a low-pressure irrigation system, a metallic outlet collar adapted to be fixedly mounted in one of the outlet openings of said system and having wedging flanges, in combination with a cap adapted to fit on the open upper end of said collar and having fingers engaging against the under faces, respectively, of said flanges, to draw said cap tightly against the upper end of said collar as the cap is partially rotated in the direction of closing, said flanges having their lower faces undercut so as to have only an edge for contact, and said fingers having their engaging faces formed in an abrupt curve to give only a fine point contact with the edge of the respective flanges.

ROBERT W. DORN.